United States Patent [19]

Avian et al.

[11] Patent Number: 4,489,689
[45] Date of Patent: Dec. 25, 1984

[54] DEVICE FOR CONTROLLING THE IGNITION AND FUEL INJECTION OF AN INTERNAL COMBUSTION ENGINE

[75] Inventors: Philippe Avian, Ecquevilly; Bernard Lepretre, Boulogne Billancourt, both of France

[73] Assignee: Regie Nationale des Usines Renault, Boulogne Billancourt, France

[21] Appl. No.: 521,409

[22] Filed: Aug. 8, 1983

[30] Foreign Application Priority Data

Aug. 11, 1982 [FR] France .................... 82 13996

[51] Int. Cl.³ .................................... F02P 5/04
[52] U.S. Cl. .................................... 123/417; 123/609
[58] Field of Search ............. 123/416, 417, 480, 486, 123/487, 609; 364/431.04

[56] References Cited

U.S. PATENT DOCUMENTS

| | | | |
|---|---|---|---|
| 4,127,091 | 11/1978 | Leichle | 123/416 |
| 4,181,884 | 1/1980 | Shirasaki et al. | |
| 4,239,024 | 12/1980 | Leichle | 123/416 |
| 4,321,580 | 3/1982 | Deleris | |
| 4,367,710 | 1/1983 | Deleris | 123/416 |

FOREIGN PATENT DOCUMENTS 2903639 8/1980 Fed. Rep. of Germany ...... 123/417

OTHER PUBLICATIONS

Automotive Engineering, vol. 89, No. 8, 1981 "Engine Controls Become More Cost Effective", pp. 28-34.
Patents Abstracts Of Japan, vol. 4, No. 164, Nov. 14, 1980, p. 49M41.
Electronic Design, vol. 29, No. 10, May 1981, R. Haines, "Two μCs on one chip split the silicon and the work", pp. 197-202.

Primary Examiner—Tony M. Argenbright
Attorney, Agent, or Firm—Oblon, Fisher, Spivak, McClelland & Maier

[57] ABSTRACT

A device for controlling the ignition and the fuel injection of an internal combustion engine, including a pressure sensor, a position sensor associated with a target fixedly mounted in rotation with the crankshaft, a first computer of the programmed microcomputer type in which are stored values of the angle of advance and the injection time addressable as a function of the engine speed and pressure parameters, and a second computer which, from the output signal of the position sensor applies to the first computer a synchronization signal assuring the marking of each top dead center and/or each bottom dead center, the first computer receiving the output signal from the pressure sensor and computing, as a function of the parameters and under the control of the synchronization signal, the injection time and the angle of ignition advance, the value of the latter being applied by the first computer from the second computer which computes the conduction angle of the ignition coil and controls the conduction of the coil as a function of the computed angles of conduction and ignition advance.

4 Claims, 1 Drawing Figure

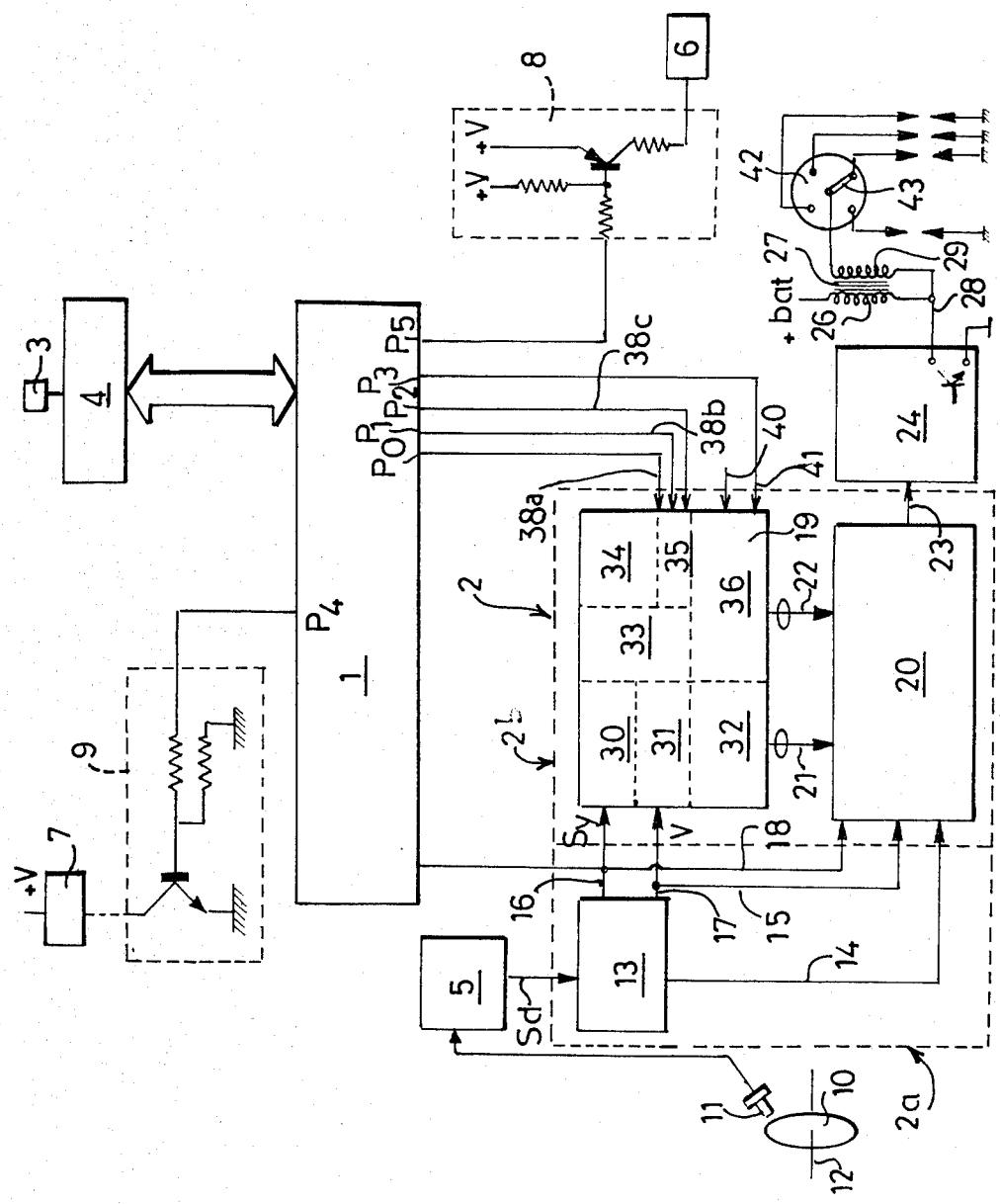

DEVICE FOR CONTROLLING THE IGNITION AND FUEL INJECTION OF AN INTERNAL COMBUSTION ENGINE

BACKGROUND OF THE INVENTION

1. Field of the Invention

This invention relates to a device for controlling the ignition and fuel injection of an internal combustion engine, of the type having a digital computer system programmed to compute the ignition advance and the injection time as a function of the speed and the load of the engine.

2. Description of the Prior Art

In any device of the above-noted type, it is necessary to measure the engine speed and to know with good precision the instantaneous angular position of the crankshaft so as to trigger the ignition at the computed angle as a function of the measured speed and load.

For this purpose, it is known how to use a target fixed in rotation with the crankshaft and exhibiting at its periphery one or more irregularities passing before a sensor that supplies a synchronization signal Sy at each passage of a piston by a predetermined position such as a top dead center (TDC) and/or by a bottom dead center (BDC). This synchronization signal makes it possible, between two consecutive TDCs or BDCs, to measure the speed with a precision suitable for computation of the angle of advance and the injection time and to trigger the start of the injection at the desired moment, generally at the top dead center, but it is not suitable for triggering the ignition which, for a given stroke, is offset by several dozen degrees in relation to the preceding TDC or BDC.

One solution which consists in performing an electronic interpolation of the synchronization signal is not satisfactory because, in case of sharp acceleration or deceleration of the engine, the electronically restored angular position does not coincide with the true angular position of the crankshaft.

Another solution consists in using a second target also fired in rotation with the first and provided at its periphery with several dozen regularly spaced teeth and hollows which pass before a second sensor. Further, since the angular resolution necessary for triggering the ignition would lead to a number of teeth and hollows incompatible with a large series production, an electronic interpolation of the signal coming from the second sensor is preferably performed. The synchronization of the interpolation signal is done at each detection of a new tooth and/or a new hollow, which makes it possible to avoid any significant error in case of sharp acceleration or deceleration of the engine. However, this second solution has the drawback of being costly on the industrial level because it requires the use of two sensors and two targets which, in addition, must be perfectly angularly adjusted in relation to one another.

U.S. Pat. No. 4,321,580 describes a process which makes it possible to solve this problem by measuring the speed and marking the angular position of the crankshaft by means of a single sensor in front of which passes a target equipped at its periphery with a series of teeth and hollows and from which at least one tooth has been eliminated to constitute an absolute reference. U.S. Pat. No. 4,367,710 describes a specific ignition computer that uses this process and makes its possible to obtain the synchronization signal Sy, an image tooth signal Sd of the teeth of the target and an interpolation signal or frequency speed signal V n times greater than Sd. From these signals, the computer computes the angle of ignition advance, the conduction time of the coil and consequently controls the coil. This computer can consist of the integrated circuit SN 96 528 of the Texas Instruments Company.

Since it involves a specific circuit, this computer is not programmable and therefore is not suitable to assure the additional function of controlling the fuel injection.

On the other hand, the processing of the signal, if it is desired to have sufficient dynamics to measure the rotation speed and an accurate marking of the TDC and/or BDC, the computation of the conduction angles of the coil and the angles of ignition advance, and the computation of the injection time would make it necessary to use a priori a fast and powerful and consequently costly, microprocessor.

Another solution described in the article titled "Engine Controls Become More Cost Effective" in the magazine Automotive Engineering, volume 89, No. 8, August 1981, consists in using two single chip microprocessors working in parallel, one for the ignition, the other for the injection, from a certain number of parameters some of which are common. A first drawback of this solution resides in the fact that the marking of the instantaneous angular position of the crankshaft is assured by an electronic interpolation of the synchronization signal that produces a pulse theoretically every 0.35° of rotation. Unfortunately, as previously shown, this restored angular marking is proved erroneous when the crankshaft is subjected to sharp accelerations or decelerations, as is the case at the low speeds of slowing down or at starting. Moreover, this solution with two microprocessors nevertheless remains costly because for a very large series production the cost of even a single chip microprocessor is greater than a microprocessor with a specific integrated circuit.

SUMMARY OF THE INVENTION

Knowing that the production rates of electronic injection systems are still currently markedly lower than those of electronic ignitions, an object of this invention is to provide a novel device for controlling the ignition and injection for an internal combustion engine which combines the advantages of the low cost of specific integrated circuits for the very large series and of the single chip microprocessors for smaller series, and which assures the use of the process described in the U.S. Pat. No. 4,321,580 for measuring the speed and making the precise instantaneous angular position of the crankshaft by means of a single sensor.

For this purpose, the invention has as its object a device for controlling the ignition and fuel injection of an internal combustion engine, including a target fixed in rotation with the crankshaft and associated with an angular position sensor, at least an ignition coil, at least a sensor for the pressure in the intake manifold of the engine, at least an injector and a computation system in which are stored the values of the angle of advance and injection time addressable as a function of the parameters for the engine speed and the pressure in the intake manifold and which, from the output signal of the position sensor, processes a synchronization signal identifying the passage of each piston by a predetermined position such as a top dead center and/or by a bottom dead center and computes the engine speed, the computation system including a first programmed microcomputer connected to the pressure sensor and controlling the injector and a second microcomputer connected to the position sensor and controlling the ignition coil, characterized in that, on the one hand, as known in the art, a single position sensor is associated with the target equipped at its periphery with a series of teeth and hollows at least one tooth of which has been eliminated to constitute an absolute reference and the second microcomputer is a specific ignition computer which processes the synchronization signal, an image signal of the teeth of the target and a frequency speed signal n times greater than that of the tooth signal from the output signal of the position sensor and which exhibits read only memories for advance correction factors and full load advance factors and for additional advance correction inputs, and wherein, on the other hand, the read only memories of the second computer contain a zero value while the values of the angle of advance and the injection time are all stored in the first programmed microcomputer which receives the synchronization signal from the second microcomputer, computes the engine speed and applies the value of the angle of advance to the additional inputs of the second microcomputer which, as a function of the signals processed from the output signal of the sensor, computes the conduction angle of the coil and controls the conduction of this coil according to the computed angles of conduction and ignition advance.

As a result of this arrangement, the specific ignition computer works as a slave, without undergoing any modification other than that of a particular programming for the law of advance which, for a "purely ignition" application, depends in any case on the engine under consideration, while freeing the microcomputer from routine tasks. This arrangement makes it possible to overcome one of the main handicaps of the specific integrated circuits which is their unsuitability for applications other than those for which they were originally designed, and, from the cost viewpoint, makes the optimum trade-off mentioned above by the association of a specific circuit manufactured at a very high rate for ignition alone and ignition combined with injection, and of a microprocessor concerned only with the second of these applications representing considerable smaller rates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying single FIGURE which is a block diagram of the architecture of the computation system of a control device according to the invention.

DESCRIPTION OF THE PREFERRED EMBODIMENTS

With reference to the drawing, the computation system includes essentially a first computer 1 consisting of a programmed microprocessor of the current type (single chip) such as, for example, the microprocessor MC 6801, and a second computer 2 which will be described in more detail below.

Microprocessor 1 receives from a sensor 3 the data on the pressure in the intake manifold converted into digital form by an analog to digital converter 4, and from computer 2 a synchronization signal Sy from which it computes the engine speed and which makes it possible to identify the passage of each cylinder at predetermined TDC. Microprocessor 1 contains in storage the values of the angle of advance and injection time addressable as a function of the speed and pressure parameters and computes, under the control of the synchronization signal Sy, the injection time for the control of one or more injectors 6 and of an injection pump 7 by power circuits 8 and 9, respectively. The microprocessor sends by its outputs Po, $P_1$ and $P_2$ and $P_3$ the computed value of the angle of ignition advance to computer 2.

Computer 2 has a first section 2a and a second section 2b. The first section 2a consists of a digital processing block 13 which receives as an input, after forming by the analog circuit 5, consisting for example of the circuit SN 96 532 of the Texas Instruments Company, the signal taken by a position sensor 11 that detects the passage of the teeth which are provided at the periphery of a target 10 fastened on the crankshaft 12 of the internal combustion engine and that turns in synchronism with the crankshaft 12. From the output signal $S_d$ of the analog circuit 5, block 13 produces the synchronization signal Sy and a frequency speed signal V n times greater than Sd. This block 13 and the manner in which the signals Sy and nSd are processed are described in U.S. Pat. No. 4,321,580 which can be referred to.

The section 2b has a computation block 19 which receives the synchronization signal Sy on an input 16 and speed signal V on a second input 17.

The essential parts of computation block 19 are the following: a sequencer 30; a stage for measuring speed 31; a read only memory 32; a pressure measurement stage 33; a safety stage 34 for guarding against any operational trouble of the computation block 19; a corrections stage 35 connected by three input conductors 38a, 38b, 38c at outputs Po, P1 and P2 respectively of microprocessor 1 and a stage 36 for computing the angle of ignition advance receiving data from output P3 of microprocessor 1 by an input 41 of series pulses. This computation block has been described in U.S. Pat. Nos. 4,127,091 and 4,239,024.

Computation block 19 delivers by its respective outputs 21 and 22 two binary numbers which correspond respectively to the conduction angle of coil 27 expressed as the number of teeth of the target 10 on its output 21 and to the angle of ignition advance expressed as the number of teeth of target 10 and as the number of subdivisions between two teeth of said target on its output 22. These two binary numbers arrive by the conductors 21 and 22 as an input on a block 20 for generating the control signal of the coil 27. Block 20 also receives as inputs thereto three signals by conductors 14, 15 and 18 which are respectively the sensor signal in Sd form, the speed signal V and the synchronization signal Sy. Block 20 for generating the control signal of the coil supplies on its output 23 a low-power signal which is sent to a power amplifier stage 24 whose output 28 is connected to ignition coil 27. Coil 27 has a primary winding 26 and a secondary winding 29 connected by one of its ends to the central part of a distributor 42. Mobile arm 43 turns around the central part of distributor 42 and successively connects, during its rotation, the secondary 29 of the ignition coil 27 with the spark plugs of the various cylinders of the engine to cause the explosion and the combustion of the fuel mixture contained in the cylinders. This last group, including block 20 for generating the control signal of coil 27 and power amplifier stage 24, has been described in U.S. Pat. No. 4,367,710.

Computer 2 which has just been briefly described and whose detailed operation is explained in above-noted patents can consist of an integrated circuit such as the circuit SN 96 528 of the Texas Instruments Company. This circuit is supposed to compute independently the conduction angle of coil 27 and the angle of ignition advance. In the device according to the invention, it fulfills only the first of these functions, the second being assured by microprocessor 1. For this purpose, the additional inputs 38a, 38b, 38c normally used to receive additional random corrections coming from various sensors and input 41 for correction of advance as a function of the pinging (inputs which are described in the French patent application No. 2,485,641) are, in this device, intended to receive constant corrections coming from microprocessor 1 and being used to generate the law of ignition. Moreover, contrary to the explanations given in French Pat. No. 2,485,641, the read only memories for the factors of advance correction and full load advance contain all the value 0° since the corrections sent by microprocessor 1 to the additional inputs 38a, 38b, 38c and 41 correspond to the computed value of the angle of ignition advance.

Finally, computation block 19 receives no "pressure" data contrary to what is indicated in French patent application No. 2,485,641 since it is microprocessor 1 which directly receives this data from the analog to digital converter 4, which makes it possible to use a single pressure sensor 3 to compute the angle of ignition advance and the injection time.

Target 10 includes, for example, 44 regularly spaced teeth of which two times two teeth have been removed at 90° from each top dead center or bottom dead center in the case of a four cylinder engine. Signal Sd sent from sensor 11 and formed by analog circuit 5 is applied to computer 2. Block 13 processes this signal Sd (not to be confused with the signal Sd of U.S. Pat. No. 4,321,580 which, itself, designates the restored tooth signal, i.e., the sensor signal formed and in which further the missing teeth are electronically restored) so as to produce the signal Sy which identifies the passage of the pistons at a top dead center. Moreover, the microprocessor which receives this signal Sy can then compute the engine speed and, from the pressure data coming from comverter 4, the angle of ignition advance and the injection time, in synchronism with the engine strokes, according to appropriate algorithms which will not be described, these algorithms being well known to specialists of the art.

As a result of the synchronization signal Sy and its inner clock, microprocessor 1 controls the beginning of the injection at a given moment after the top dead center and for the computed time.

Moreover, microprocessor 1 indicates at block 19 what angle of advance it must supply to block 19. By programming, for example, flywheel values 8°, 16° and 32° for the additional corrections on the inputs 38a, 38b and 38c, microprocessor 1 can indicate all the advances between 0° and 56° as engine flywheel by a step of 80°. The maximum value of 56° is generally largely sufficient for all internal combustion engines. Output P3 of microprocessor 1 is used to refine the generation of the law of advance and to obtain a precision of 1° of the angle of advance. For this purpose, output P3 of microprocessor 1 is connected to input 41 of computation block 19, including another input 40, which controls the sign of the correction applied at input 41, and is prepositioned so that this sign is negative. Microprocessor 1, therefore, has to send in parallel only a signal "0" or "1" on the three inputs 38a, 38b and 38c to make an approximation of the value of advance to be generated by a step of 8°, a value which is decremented one degree at a time by sending to input 41 a number of pulses between 0 and 7 to correct the "approximated" value and to indicate at block 19, with a resolution of 1° the value of advance to be taken into account.

There can be generated, for example, a flywheel angle of advance of 22° by controlling two of the inputs 38a, 38b, 38c for generating "corrections" of 8° and 16°, and the microprocessor will only have to send two series pulses to 41 so that the computation block 19 effectively delivers this flywheel value of 22° with a conduction angle that computer 2 will have determined, indicated in U.S. Pat. No. 4,367,710 or French Pat. No. 8023502, from the measurement of the engine speed that it will have performed parallel to microprocessor 1. The time lost by microprocessor 1 in sending the necessary data to computer 2 is therefore very short.

The computation system of the device for control and ignition according to the invention is, therefore, particularly inexpensive since it requires only a single pressure sensor and since it associates a computer designed initially to generate independently the law of ignition and produced in large series at a low cost with a low-power microprocessor of the current type.

The use of a low-power microprocessor is made possible because the low-power microprocessor is freed from processing the synchronization signal and from functions relating to the control of the ignition coil, namely computation of the conduction angle, regulation of the current and varying of dwell.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for controlling the ignition and fuel injection of an internal combustion engine having an intake manifold, a crankshaft, plural pistons coupled to the crankshaft, a fuel injector, and an ignition coil, comprising:

a target fixedly rotating with the crankshaft, said target having a periphery provided with a series of teeth and hollows, at least one tooth of which has been eliminated to define a predetermined absolute reference;

a single angular position sensor associated with said target;

a sensor for measuring pressure in said intake manifold of the engine;

a computation system in which are stored predetermined values of angle of advance and injection time addressable as a function of the parameters of engine speed and pressure in the intake manifold, said computation system comprising, sensor processing means for producing from an output signal of the position sensor a synchronization signal (Sy) identifying the passage of each piston by a predetermined position and for computing engine speed, a first microcomputer connected to the pressure sensor and controlling the injector, and a second microcomputer connected to the position sensor and controlling the ignition coil, the second microcomputer being a dedicated ignition computer for processing said synchronization signal (Sy), an image signal (Sd) of the teeth of the target and a frequency speed signal (V) n times greater than that of the image signal (Sd) from the output signal of the position sensor, said second microcomputer including read only memory means for storing factors of correction for advance, for full load advance, and for predetermined additional inputs for correction of advance, said read only memory means of the second microcomputer containing a zero value, said first microcomputer including means for storing the values for the angle of advance and injection time, means for receiving the synchronization signal (Sy), means for computing the engine speed and angle of advance and for applying a value of the angle of advance to the predetermined additional inputs of the second microcomputer, said second microcomputer including means for computing the conduction angle of the coil as a function of said signals processed from the output signal of the sensor processing means, and means for controlling the conduction of said coil according to the computed angles of conduction and ignition advance.

2. A device as in claim 1, wherein said predetermined additional inputs for correction of advance comprise:

plural parallel inputs programmed with whole values greater than a final resolution of the angle of ignition advance and to which the first programmed microcomputer applies the closest number to the computed angle of advance, and at least a series input to which the first computer microcomputer applies pulses to correct said closest number and to indicate to the second microcomputer an exact value of the computed angle of advance.

3. A device as claim 1 wherein said second microcomputer comprises:

means parallel to the first microcomputer for measuring the engine speed and computing the conduction angle of the ignition coil from said measured value of the engine speed.

4. A device as claim 2 wherein said second microcomputer comprises:

means parallel to the first microcomputer for measuring the engine speed and computing the conduction angle of the ignition coil from said measured value of the engine speed.

* * * * *